United States Patent
Nishiyama et al.

(10) Patent No.: US 10,891,280 B2
(45) Date of Patent: Jan. 12, 2021

(54) CONTROLLER FOR IMPROVED TIME-SERIES DATA COLLECTION

(71) Applicant: OMRON Corporation, Kyoto (JP)

(72) Inventors: Yoshihide Nishiyama, Yokohama (JP); Shigeyuki Eguchi, Joyo (JP); Masanori Ota, Otsu (JP)

(73) Assignee: OMRON Corporation, Kyoto (JP)

( * ) Notice: Subject to any disclaimer, the term of this patent is extended or adjusted under 35 U.S.C. 154(b) by 213 days.

(21) Appl. No.: 15/900,935

(22) Filed: Feb. 21, 2018

(65) Prior Publication Data
US 2018/0285398 A1    Oct. 4, 2018

(30) Foreign Application Priority Data

Mar. 31, 2017    (JP) ................................. 2017-072171

(51) Int. Cl.
| | | |
|---|---|---|
| G06F 17/30 | (2006.01) | |
| G06F 16/22 | (2019.01) | |
| G05B 19/042 | (2006.01) | |
| G05B 19/4155 | (2006.01) | |

(52) U.S. Cl.
CPC ..... *G06F 16/2228* (2019.01); *G05B 19/0428* (2013.01); *G05B 19/4155* (2013.01); *G06F 16/2282* (2019.01); *G05B 2219/23027* (2013.01)

(58) Field of Classification Search
CPC ............. G06F 16/2228; G06F 16/2282; G05B 19/0428; G05B 19/4155
See application file for complete search history.

(56) References Cited

U.S. PATENT DOCUMENTS

| | | | |
|---|---|---|---|
| 2003/0050725 A1 | 3/2003 | Dirnfeldner | |
| 2006/0056436 A1* | 3/2006 | Horikawa | H04L 12/66 370/412 |
| 2008/0065706 A1* | 3/2008 | Miller | G05B 15/02 |
| 2012/0254517 A1 | 10/2012 | Jang | |
| 2013/0254584 A1 | 9/2013 | Tamaoki | |
| 2014/0032842 A1 | 1/2014 | Goshi | |
| 2014/0344511 A1 | 11/2014 | Kim | |

(Continued)

FOREIGN PATENT DOCUMENTS

| | | |
|---|---|---|
| CN | 103577305 A | 2/2014 |
| CN | 104182178 A | 12/2014 |

(Continued)

OTHER PUBLICATIONS

Waddington, Daniel G., and Changhui Lin. "A fast lightweight time-series store for iot data." arXiv preprint arXiv:1605.01435 (2016). (Year: 2016).*

(Continued)

*Primary Examiner* — Usmaan Saeed
*Assistant Examiner* — William P Bartlett
(74) *Attorney, Agent, or Firm* — Metrolex IP Law Group, PLLC

(57) ABSTRACT

A controller controls a control target. The controller includes a time-series database that stores a record including data about the control target in chronological order, a data generator that generates data to be included in the record to enter the time-series database in every predetermined cycle, and a nonblocking queue included in a volatile main memory that sequentially stores the data generated by the data generator.

10 Claims, 11 Drawing Sheets

(56) References Cited

U.S. PATENT DOCUMENTS

| | | | | |
|---|---|---|---|---|
| 2016/0092484 A1* | 3/2016 | Finkler | ............... | G06F 16/2272 |
| | | | | 707/715 |
| 2017/0244991 A1* | 8/2017 | Aggarwal | ........ | H04N 21/23805 |
| 2017/0270183 A1* | 9/2017 | Kuroda | ............... | G06F 16/2477 |
| 2017/0316061 A1* | 11/2017 | Hubauer | ........... | G06F 16/24575 |
| 2018/0246924 A1* | 8/2018 | Altaf | .................. | G06F 16/2365 |

FOREIGN PATENT DOCUMENTS

| | | |
|---|---|---|
| CN | 103261983 B | 5/2016 |
| CN | 105930282 A | 9/2016 |
| EP | 2806318 A1 | 11/2014 |
| JP | H5-334173 A | 12/1993 |
| JP | 2001-337965 A | 12/2001 |
| JP | 2004-199670 A | 7/2004 |
| WO | 2016/045734 A1 | 3/2016 |

OTHER PUBLICATIONS

The Japanese Office Action dated May 15, 2018 in a counterpart Japanese patent application.

Anonymous, "Linked list—Wikipedia", Dec. 19, 2016, pp. 1-18, retrieved from the Internet: URL:https://en.wikipedia.org/w/index.php?title=Linked_list&oldid=755658596, retrieved on Jun. 27, 2017, relevance is indicated in the EESR issued on Aug. 31, 2018 in a counterpart European patent application.

The extended European search report (EESR) dated Aug. 31, 2018 in a counterpart European patent application.

Office Action dated Aug. 28, 2020 in a counterpart Chinese patent application.

\* cited by examiner

FIG. 5A structure of record Information

| Time | Counter value | Index value | • Input data (input value set)<br>• Output data (output value set)<br>• Operation data (operation value set)<br>• Manufacturing data (execution instruction value set)<br>• Event data |
|---|---|---|---|
| 1821 | 1822 | 1823 | 1824 |

FIG. 5B

Record information examples

| 2016.9.20<br>10:50:34.250.000 | 123456789 | 567890 | Product No. 001 | Sensor 1 = 1.234 | Variable X = 0.789 | Motion target value |
| 2016.9.20<br>10:50:34.250.500 | 123456889 | 567891 | Product No. 001 | Sensor 1 = 1.235 | Variable X = 0.800 | Motion target value |

| | | | |
|---|---|---|---|
| TimeSeries (time-series) | Storage | | Current use of storage |
| | | | Upper limit of storage |
| | | | Path to storage destination |
| | Put record | 702 | Number of Put requests from UPG |
| | | | Number of lost Put requests from UPG |
| | | | Number of Put requests from C-Binding |
| | | | Number of successes in Put record writing |
| | | | Number of successful bytes in Put record writing |
| | | | Number of failures in Put record writing |
| | | 704 | Number of records |
| | Put performance (for each band) | | Min time taken to process Put per record |
| | | | Max time taken to process Put per record |
| | | | Average time taken to process Put per record |
| | Query | | Number of query requests |
| | | | Total time taken to process query requests |
| | Fetch | | Total number of fetched records |
| | | | Total size of fetched data |
| | | | Total time taken for fetching |
| | Export | | Number of export requests |
| | | | Total time taken to process exports |
| TSDBService (database manager) | Subscriber | 706 | Number of NBQs |
| | | | Number of current queuings in NBQ |
| | | | Max number of queuings in NBQ |
| | | | Upper limit of queueing NBQ |
| | | | Number of overflown queues from NBQ |
| | TimeSeriesHandle | | Number of current handlings by TimeSeries from UPG |
| | | | Number of max handlings by TimeSeries from UPG |
| | | | Number of current handlings by TimeSeries from C-Binding |
| | | | Number of max handlings by TimeSeries from C-Binding |
| | TSDBHandle | | Number of current handlings by TSDB |
| | | | Number of max handlings by TSDB |

700

CONTROLLER FOR IMPROVED TIME-SERIES DATA COLLECTION

CROSS REFERENCE TO RELATED APPLICATIONS

This application claims priority from prior Japanese Patent Application No. 2017-072171 filed with the Japan Patent Office on Mar. 31, 2017, the entire contents of which are incorporated herein by reference.

FIELD

The disclosure relates to a controller for collecting and storing data about a control target.

BACKGROUND

Factory automation (FA) technology involving controllers, such as programmable logic controllers (PLCs), has been widely used at various production sites. A demand is increasing for posterior analysis of data processed by such controllers.

For example, Japanese Unexamined Patent Application Publication No. 2004-199670 (Patent Literature 1) describes a data collection apparatus that collects data rapidly from a central processing unit (CPU) in a PLC in a reliable manner. More specifically, Patent Literature 1 describes a data collection apparatus connected to the PLC with a PLC bus to collect input and output (I/O) data from the CPU.

The progress in information and communication technology (ICT) now enables controllers to collect and store a large amount of data. In this situation, a PLC may have an expanded capability for collecting data, rather than being a data collection apparatus connected to the PLC for collecting data.

CITATION LIST

Patent Literature

Patent Literature 1: Japanese Unexamined Patent Application Publication No. 2004-199670

SUMMARY

Technical Problem

A PLC updates I/O data in short cycles synchronized with its control cycles. The PLC uses a large-capacity storage for collecting such I/O data. However, a large-capacity storage has a lower access speed (particularly a lower writing speed) than a main memory, such as a random access memory (RAM). This generates the need for a mechanism for allowing records including rapidly generated data to enter a large-capacity storage.

Solution to Problem

An aspect provides a controller for controlling a control target. The controller includes a time-series database that stores a record including data about the control target in chronological order, a data generator that generates data to be included in the record to enter the time-series database in every predetermined cycle, and a nonblocking queue included in a volatile main memory that sequentially stores the data generated by the data generator.

In an aspect, when the data generator generates data to be included in the record to enter the time-series database, the generated data is first temporarily stored in the nonblocking queue, and then stored into the time-series database. This allows records including rapidly generated data to enter the time-series database, or a storage, in a reliable manner.

In one or more embodiments, the time-series database includes a database manager that sequentially reads the data stored in the nonblocking queue and stores the read data into the time-series database.

In an aspect, the database manager separate from the data generator for writing data to the nonblocking queue reads data from the nonblocking queue and stores the data into the time-series database, enabling the processes to be independent of each other for easily controlling the data collecting speed.

In one or more embodiments, the nonblocking queue includes a plurality of shared buffers logically defined in the volatile main memory and an occupancy list for managing a data storage status of each of the plurality of shared buffers, and data generated by the data generator is stored into a shared buffer specified from the plurality of shared buffers by referring to the occupancy list, and the shared buffer storing the data is logically linked to another shared buffer storing preceding data.

In an aspect, the shared buffers in the volatile main memory logically define the nonblocking queue, which can thus be resized easily.

In one or more embodiments, the logically-linked shared buffer is logically delinked when the data is read from the logically shared buffer.

In an aspect, the shared buffers are sequentially delinked after stored data is read from the buffers. This structure prevents the number of predefined shared buffers or the size of the buffer pool from increasing excessively.

In one or more embodiments, the time-series database further includes a write buffer that temporarily stores the data read from the nonblocking queue, and the database manager outputs a plurality of data items stored in the write buffer to a database file as a record.

In an aspect, the data items read from the nonblocking queue are output as a single record to the database file, thus enabling the processing in accordance with the write characteristics of the storage.

In one or more embodiments, the data generator completes a single process for generating the data within the predetermined cycle, and the database manager operates during an unoccupied time of a processor.

In an aspect, the database manager for performing a supplemental process not directly associated with a control operation for a control target operates during an unoccupied time of the processor, without affecting the processing for the control operation.

In one or more embodiments, the data generator performs a process using an operation circuit different from an operation circuit that is used by the database manager to perform a process.

In an aspect, generating data to be included in the record and storing the record including the generated data are independent of each other, thus improving the overall throughput.

In one or more embodiments, the controller further includes a status information output unit that outputs information indicating a status of an operation associated with the time-series database including storing data into the nonblocking queue.

In an aspect, the nonblocking queue and the time-series database can be evaluated by referring to output information indicating the operating status. Such evaluation eases sizing or other tuning.

In one or more embodiments, the nonblocking queue is sized based on a data speed at which the data generator cyclically generates data without overflow of stored data.

In an aspect, the nonblocking queue is preliminary sized in accordance with the speed at which data is generated cyclically by the data generator. This structure prevents an abnormal operation after in use.

Advantageous Effects

One or more aspects are directed to a structure for allowing records including rapidly generated data to enter a large-capacity storage.

BRIEF DESCRIPTION OF THE DRAWINGS

FIGS. 5A and 5B are diagrams each illustrating an example data structure of a record stored in a time-series database in a controller according to one or more embodiments.

FIG. 9 is a diagram illustrating example status information about a time-series database output from a controller according to one or more embodiments.

DETAILED DESCRIPTION

Figure 1:
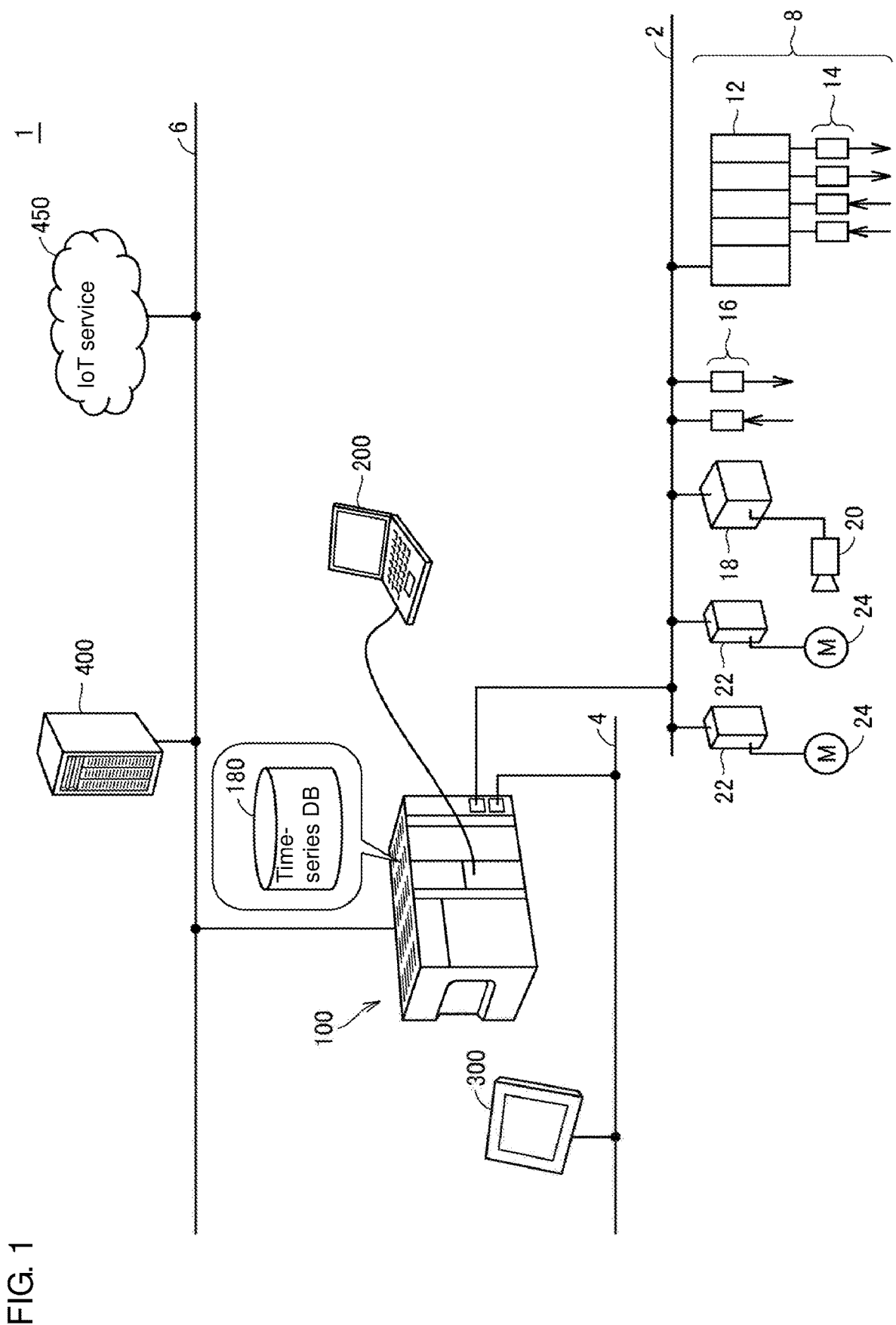
FIG. 1 is a schematic diagram illustrating the overall configuration of a control system according to one or more embodiments.

One or more embodiments will now be described with reference to the drawings. The same or corresponding components in the figures are given the same reference numerals, and will not be described repeatedly.

A. Overall Configuration of Control System

The overall configuration of a control system 1 including a controller according to one or more embodiments will now be described.

FIG. 1 is a schematic diagram showing the overall configuration of the control system 1 according to one or more embodiments. Referring to FIG. 1, the control system 1 according to one or more embodiments mainly includes a controller 100 for controlling a control target.

The controller 100 may be a computer, such as a programmable logic controller (PLC). The controller 100 is connected to a field device group 8 with a fieldbus 2, and to one or more displays 300 with a fieldbus 4. The controller 100 transmits and receives data to and from each connected device through the corresponding bus or network. A common fieldbus may also be referred to as a field network. For simplicity, a fieldbus and a field network will be hereafter collectively referred to as a fieldbus. More specifically, a fieldbus herein may include a field network as well as a fieldbus.

The controller 100 performs control operations for various computations for controlling manufacturing apparatuses and equipment. In addition to the control operation, the controller 100 performs input and output processing to obtain data measured by the field device group 8 and transferred to the controller 100 (hereafter, input data) or various data items calculated through the control operations.

The controller 100 further includes a time-series database 180. As described later, the time-series database 180 stores various data items obtained through the input and output processing in chronological order. Although the time-series database 180 is defined in the controller 100 in the typical example described below, the time-series database 180 may be outside the controller 100 (e.g., in a host system such as a database server). The database may be hereafter simply referred to as the DB.

More specifically, the controller 100 performs a data generation process for generating a record including specified data about a control target. The time-series database 180 stores the data generated through the data generation process in chronological order.

The series of records stored in the time-series database 180 may also be referred to as time-series data. Time-series data herein refers to a series of values obtained by continuously (or intermittently at predetermined intervals) observing chronological changes of data (observation value) for a given target.

An observation value herein collectively refers to any value (real value) usable in the controller 100 for performing a control operation. Typical examples of observation values include a value obtained from a control target and to be input for a control operation (e.g., a measured value obtained from a field), a value output to a control target determined by a control operation based on an obtained input value (e.g., a command value to be provided to a field), and an operation value calculated during a control operation (any variable). More specifically, an observation value includes any value to be stored as data in the controller 100 or to be output externally as data from the controller 100.

The fieldbus 2 and the fieldbus 4 may use a bus or a network for constant cycle communication that enables an on-time arrival of data. The bus or the network for such constant cycle communication is, for example, EtherCAT (registered trademark), or may be EtherNet/IP (registered trademark), DeviceNet (registered trademark), or ComponentNet (registered trademark).

The field device group 8 includes devices for collecting input data from a control target or a manufacturing apparatus and a production line associated with control (hereafter also collectively referred to as a field). The devices for collecting input data may include an input relay and various sensors (e.g., an analog sensor, a temperature sensor, and a vibration sensor). The field device group 8 also includes devices for acting on the field in a certain manner in response to a command (or output data) generated in the controller 100. The devices for acting on the field may include an output relay, a contactor, a servo driver, a servomotor, and any actuator.

The field device group 8 transmits and receives data including input data and output data to and from the controller 100 through the fieldbus 2. In the configuration shown in FIG. 1, the field device group 8 includes a remote input-output (I/O) device 12, a relay group 14, an image sensor 18 having a camera 20, and servo drivers 22 each having a servomotor 24. The field device group 8 may not have this structure, and may include any device that collects input data or acts in response to output data.

The remote I/O device 12 includes a communication coupler that performs communication through the fieldbus 2, and an input and output unit (hereafter, I/O unit) that obtains input data and outputs output data. The input data and the output data are transmitted and received between the controller 100 and the field through the I/O unit. In the example shown FIG. 1, digital signals are transmitted and received as input data and output data through the relay group 14.

The I/O unit may be directly connected to the field network. In the example shown in FIG. 1, I/O units 16 are directly connected to the fieldbus 2.

The image sensor 18 performs image measurement, such as pattern matching, using image data captured by the camera 20, and outputs the measurement results to the controller 100.

The servo driver 22 drives the servomotor 24 in accordance with output data (e.g., a position command or a speed command) from the controller 100.

As described above, data is transmitted and received between the controller 100 and the field device group 8 through the fieldbus 2. The data transmitted and received is updated in very short cycles in the order of several hundreds of microseconds to several tens of milliseconds. Such update of data to be transmitted and received may be referred to as I/O refresh.

The display 300, which is connected to the controller 100 with the fieldbus 4, receives a user operation and outputs a command in accordance with the user operation to the controller 100, and also graphically displays the operational result obtained in the controller 100.

The controller 100 may be connected to a support apparatus 200. The support apparatus 200 supports preparations for the controller 100 to control a control target. More specifically, the support apparatus 200 provides a development environment for programs to be executed by the controller 100 (e.g., a program creation and editing tool, a parser, and a compiler), a setting environment for setting parameters (configurations) for the controller 100 as well as various devices connected to the controller 100, and processing to output a created user program to the controller 100, and processing for online correction and modification of a user program to be executed by the controller 100.

The controller 100 further performs a gateway process for outputting data obtained through the input and output processing and/or data stored in the time-series database 180 to an external device.

Typical examples of the external device shown in FIG. 1 include a manufacturing execution system (MES) 400 and an Internet of things (IoT) service 450, which are connected to the controller 100 with an upper network 6. The controller 100 may provide information from a control target, such as a manufacturing apparatus or a piece of equipment, to the external system or the external service.

The MES 400 obtains information from a control target, such as a manufacturing apparatus or a piece of equipment, and monitors and manages the overall production. The MES 400 may also manage other information such as order information, quality information, and shipping information. The MES 400 may have an internal database for storing information, or an external database for storing information may be provided parallel with the MES 400. The controller 100 may obtain, from the MES 400, manufacturing data indicating the manufacturing state of a control target, such as a manufacturing apparatus or a piece of equipment.

The IoT service 450 may be a cloud service, which is implemented by one or more computers connected to the upper network 6 or to the Internet connected to the upper network 6. A system providing the IoT service 450 performs a communication process, processes any information transmitted from the controller 100 using one or more processors (e.g., central processing units or CPUs, micro-processing units or MPUs, and graphics processing units or GPUs), and provides a predetermined output.

The IoT service 450 may be a system that obtains information from a control target, such as a manufacturing apparatus or a piece of equipment, to perform macroanalysis or microanalysis. Examples include data mining that extracts a characteristic tendency in information provided from the control target, such as a manufacturing apparatus or a piece of equipment, and a machine learning tool for performing machine learning based on information provided from the control target, such as a manufacturing apparatus or a piece of equipment.

The controller 100 may be connected to another controller 100 in a communicable manner.

B. Hardware Configuration of Controller

The hardware configuration of the controller 100 included in the control system 1 according to one or more embodiments will now be described.

Figure 2:
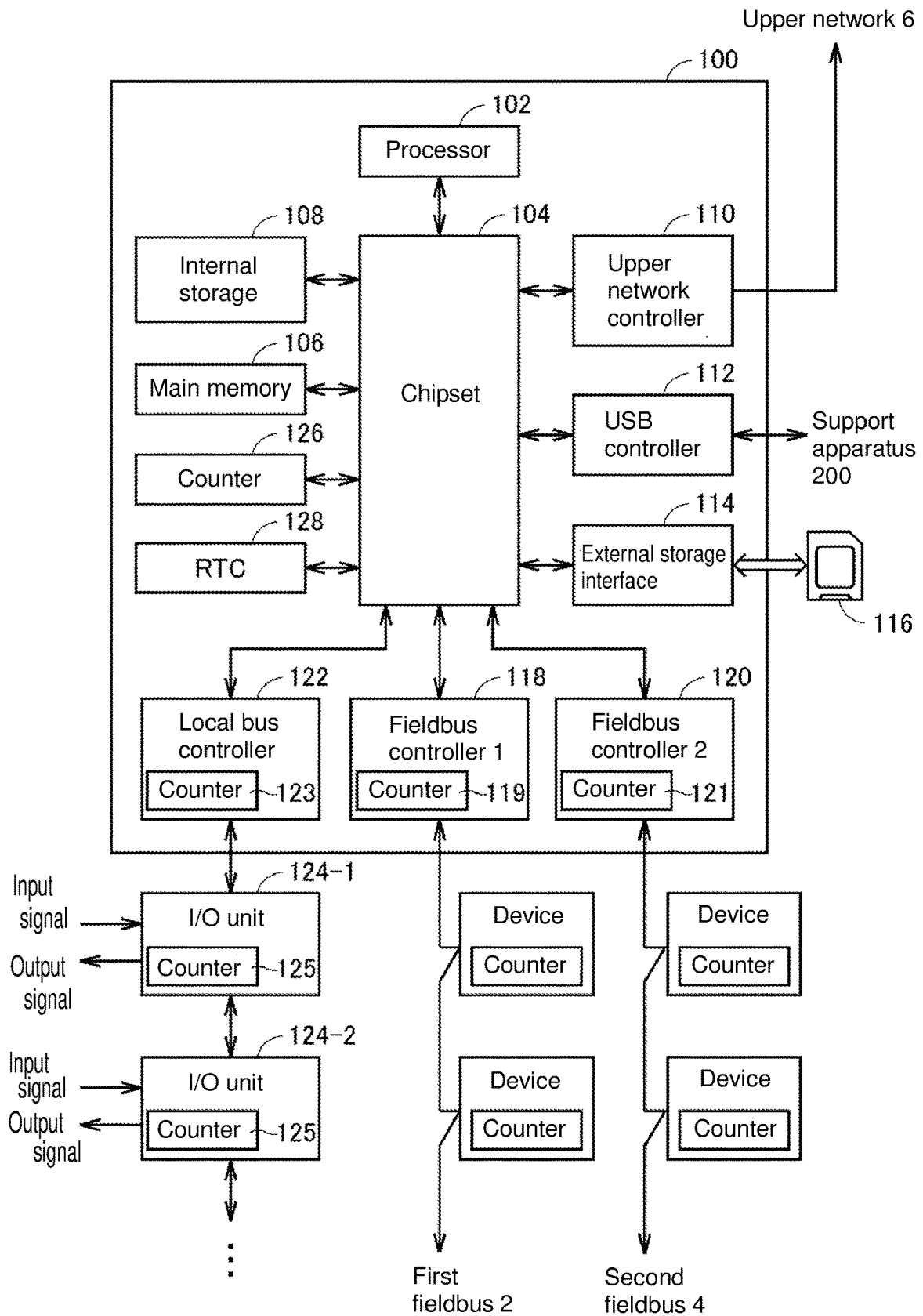
FIG. 2 is a block diagram illustrating the hardware configuration of a controller according to one or more embodiments.

FIG. 2 is a block diagram showing the hardware configuration of the controller 100 according to one or more embodiments. Referring to FIG. 2, the controller 100 includes an operation unit and one or more I/O units 124-1, 124-2, and subsequent I/O units.

The controller 100 includes a processor 102, a chipset 104, a main memory 106, an internal storage 108, an upper network controller 110, a universal serial bus (USB) controller 112, an external storage interface 114, a local bus controller 122, fieldbus controllers 118 and 120, a counter 126, and a real time clock (RTC) 128.

The processor 102 includes a CPU, an MPU, or a GPU. The processor 102 reads various programs stored in the internal storage 108, and expands the programs in the main memory 106 and executes the programs to appropriately control a control target and perform various processes described later. The internal storage 108 is, for example, a nonvolatile storage device, such as a hard disk drive (HDD) or a solid state drive (SSD). The main memory 106 is, for example, a volatile memory, such as a dynamic random access memory (DRAM) or a static random access memory (SRAM).

The chipset 104 controls the processor 102 and each unit to enable the overall processing of the controller 100.

The internal storage 108 stores system programs for implementing basic operations and user programs created in accordance with control targets, such as a manufacturing apparatus or a piece of equipment.

The upper network controller 110 transmits and receives data to and from the MES 400 or the IoT service 450 (refer to FIG. 1) through the upper network 6. The upper network controller 110 is typically implemented using a dedicated circuit such as an application-specific integrated circuit (ASIC) or a field-programmable gate array (FPGA).

The USB controller 112 controls data transmitted to and received from the support apparatus 200 with a universal serial bus (USB) connection. The USB controller 112 is typically implemented using a dedicated circuit such as an ASIC and an FPGA.

The external storage interface 114 can receive a removable external storage 116, to which data can be written, and from which various items of data (e.g., a user program and trace data) can be read. The external storage 116 corresponds to a volatile memory including a flash memory, such as a secure digital (SD) card.

The counter 126 is used as a time reference for managing a timing at which the controller 100 performs each process. The counter 126 typically increments or decrements its counter value in every predetermined cycle. The counter 126 may be implemented using, for example, a high precision event timer (HPET), which is a hardware timer located on a system bus for driving the processor 102, or using a dedicated circuit, such as an ASIC or an FPGA.

The RTC 128 is a counter that functions as a clock, and provides the current time to the processor 102 and other devices.

The local bus controller 122 is an interface that transmits and receives data to and from the I/O units 124-1, 124-2, and subsequent I/O units mounted on the controller 100. The local bus controller 122 is typically implemented using a dedicated circuit such as an ASIC or an FPGA, but may be implemented with software.

In software implementations, the local bus controller 122 mainly includes a processor, a main memory, and a storage. The processor reads system programs (firmware) stored in the storage, and expands the programs in the main memory and executes the programs to implement intended processing.

The local bus controller 122 includes a counter 123 used as a time reference for timing management between the local bus controller 122 and the I/O units 124-1, 124-2, and subsequent I/O units, which are other devices connected with a local bus. Similarly, each of the I/O units 124-1, 124-2, and subsequent I/O units also includes a counter 125 used as a time reference for timing management between one of the I/O units and the local bus controller 122 as well as between one of the I/O units and the other I/O units. The counters 123 and 125 may have the same structure as the counter 126 as described above.

The fieldbus controller 118 controls data transmission and reception to and from other devices through the fieldbus 2. The fieldbus controller 118 is typically implemented using a dedicated circuit such as an ASIC or an FPGA, but may be implemented with software. In software implementations, the fieldbus controller 118 mainly includes a processor, a main memory, and a storage. The processor reads system programs (firmware) stored in the storage, and expands the programs in the main memory and execute the program to implement intended processing. The fieldbus controller 118 includes a counter 119 used as a time reference for timing management between the fieldbus controller 118 and the other devices.

Similarly, the fieldbus controller 120 transmits and receives data to and from other devices through the fieldbus 4. The fieldbus controller 120 is typically implemented using a dedicated circuit such as an ASIC or an FPGA, but may be implemented with software. In software implementations, the fieldbus controller 120 mainly includes a processor, a main memory, and a storage. The processor reads system programs (firmware) stored in the storage, and expands the programs in the main memory and execute the programs to implement intended processing. The fieldbus controller 120 includes a counter 121 used as a time reference for timing management between the fieldbus controller 120 and the other devices.

Each of the other devices also includes a counter used as a time reference for timing management between one of the other devices and the fieldbus controller 118 or the fieldbus controller 120.

The counter 119, the counter 121, and the counter included in each device may have the same structure as the counter 126 described above.

The fieldbus controllers 118 and 120 function as communication masters for constant cycle communication through the fieldbuses. The fieldbus controllers 118 and 120 each sequentially monitor the difference between the counter values indicated by the counter included in each device connected to the corresponding fieldbus and the counter values indicated by the counter 119 or 121. The fieldbus controllers 118 and 120 output, as appropriate, a synchronization signal to a device holding a deviated counter value to instruct this device to correct the deviation. In this manner, the fieldbus controllers 118 and 120 perform a synchronization management processing for instructing a device to have the same counter value indicated by its counter as the counter value indicated by the counter 119 or 121.

The controller 100 according to one or more embodiments includes the time-series database 180 (refer to FIG. 1), which may be a storage area included in the internal storage 108 and/or the external storage 116. The internal storage 108 and the external storage 116 may hereafter be simply referred to as a storage. The volatile main memory 106 may be referred to as a memory, in contrast to the storage.

The time-series database 180 according to one or more embodiments includes, in addition to the storage area for storing database files, a buffering area or a working area to be used by the processor 102 to perform operations including generation and writing or reading of database files, and to perform various other operations.

Although FIG. 2 shows the configuration in which the processor 102 executes programs to provide intended processes, some or all of the provided processes may also be implemented using dedicated hardware circuits (e.g., ASICs or FPGAs). The main part of the controller 100 may be implemented using hardware with a general-purpose architecture (e.g., an industrial computer based on a general-purpose computer). In that case, multiple operating systems (OSes) for different uses may run in parallel using a virtualization technique, and an intended application may be executed on each OS.

Although the control system shown in FIGS. 1 and 2 includes the controller 100, the support apparatus 200, and the display 300 as separate devices, some or all of the processes performed by these components may be performed by a single device.

C. Software Configuration of Controller

The software configuration of the controller 100 included in the control system 1 according to one or more embodiments will now be described.

Figure 3:
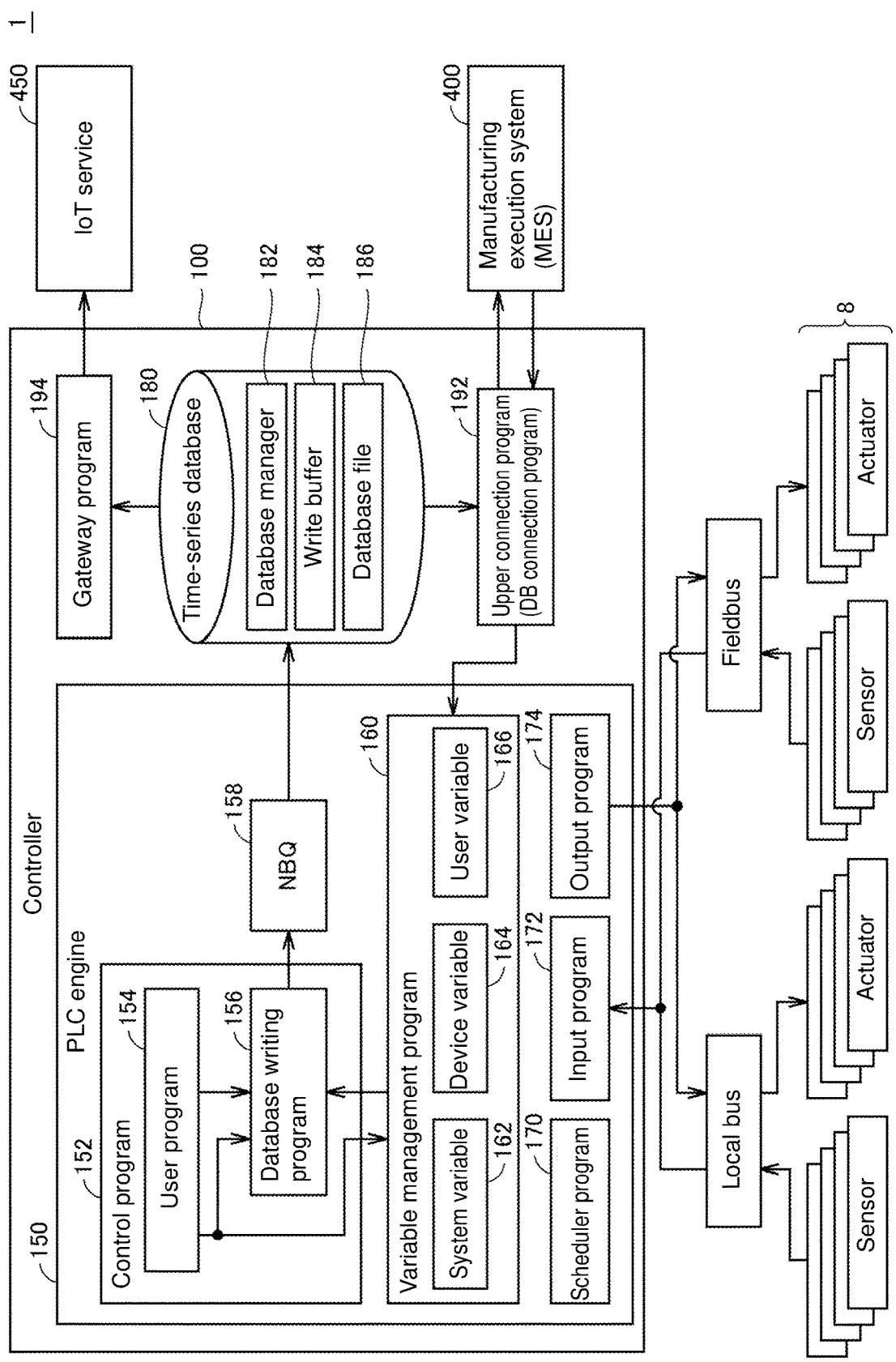
FIG. 3 is a block diagram illustrating the software configuration of a controller according to one or more embodiments.

FIG. 3 is a block diagram showing the software configuration of the controller 100 according to one or more embodiments. Referring to FIG. 3, the controller 100 includes a PLC engine 150, the time-series database 180, an upper connection program 192, and a gateway program 194.

The PLC engine 150 is typically provided with an environment for executing various programs with the processor 102 in the controller 100 reading a system program stored in the internal storage 108, and expanding the program in the main memory 106 and executing the program. The PLC engine 150 may execute various programs in this execution environment.

More specifically, the PLC engine 150 selectively executes a control program 152, a variable management program 160, a scheduler program 170, an input program 172, and an output program 174. The PLC engine 150 includes a nonblocking queue (NBQ) 158.

The NBQ 158 is, for example, a shared memory area defined in the memory (volatile main memory 106). The shared memory area is shared and accessed when a plurality of tasks or processes are performed. In addition to the shared memory area defined in the main memory 106, the NBQ 158 is defined by a buffer management process performed by the processor 102 executing the corresponding system program. The buffer management process defines a buffer pool including a plurality of data areas (shared buffers described later) each having a predetermined size within the shared memory area. The buffer management process also manages the status of each shared buffer (e.g., unoccupied, storing data, and reserved). The system program for performing the buffer management process includes a processor command such as a compare and swap (CAS) instruction for performing processes such as writing data to an unoccupied buffer.

The buffer management process for defining the NBQ 158 uses an interface for receiving data writing from the control program 152 and an interface for receiving dequeue from a database manager 182. These interfaces allow use of the NBQ 158 in a logical data transmission path from a database writing program 156 to the time-series database 180.

The variable management program 160, the scheduler program 170, the input program 172, and the output program 174 may be implemented using some of the system programs. In this case, a single system program may also achieve the processes provided by these programs.

The control program 152 typically includes a user program 154 and the database writing program 156. The user program 154 mainly corresponds to the control operation process, and may be defined freely in accordance with a control target of the controller 100, such as a manufacturing apparatus or a piece of equipment. The user program 154 may be defined by, for example, the ladder logic using function blocks.

The database writing program 156 corresponds to a code that at least partially provides the data generation process in the controller 100. The database writing program 156 is called in every predetermined cycle by an instruction defined in the user program 154, and generates data for a record to enter the time-series database 180. More specifically, the data transmission path from the database writing program 156 to the time-series database 180 includes the NBQ 158. The database writing program 156 writes specified data into the NBQ 158, instead of directly writing the data to the time-series database 180.

The NBQ 158 is a buffer that allows the database writing program 156 to continue its process before completion of data written to the time-series database 180. The NBQ 158 stores data provided from the database writing program 156 into a queue. The NBQ 158 sequentially stores data generated by the database writing program 156. The data (queue) stored in the NBQ 158 is sequentially read and stored into the time-series database 180.

The database writing program 156 may be linked with a serialization communication program. The serialization communication program serializes data to be written to the time-series database 180 from the database writing program 156. More specifically, the serialization communication program is executed by the PLC engine 150 to convert the time-series data into a storable byte string (serialization). The target data is serialized and converted into a predetermined byte string before stored into the time-series database 180.

The time-series database 180 at least partly uses the storage (the internal storage 108 or the external storage 116 shown in FIG. 2). The time-series database 180 includes the database manager 182 and a write buffer 184, in addition to a database file 186 chronologically storing data from the database writing program 156.

The database manager 182 is typically implemented by the processor 102 in the controller 100 reading the system programs stored in the internal storage 108, and expanding the programs in the main memory 106 and executing the programs. The database manager 182 adds records to the database file 186, and searches for and retrieves a record from the database file 186 in accordance with an external request. The database manager 182 sequentially reads data stored in the NBQ 158, and adds the data to the database file 186.

The write buffer 184 may be implemented by a memory area defined in the main memory 106 or a memory area defined in a cache memory included in the storage.

The database file 186 sequentially stores, as records, time-series data written by the database writing program 156. The database file 186 stores at least part of input data, output data, operation data calculated through control operations performed by the control program 152, manufacturing data, and event data in chronological order.

The overall processing performed by the database writing program 156, the NBQ 158, and the time-series database 180 will be described in detail later.

The variable management program 160 manages values usable in the PLC engine 150 in the form of variables. More specifically, the variable management program 160 manages a system variable 162 indicating, for example, the status of the controller 100, a device variable 164 indicating a value held in any device connected to the controller 100 with a local bus or a fieldbus, and a user variable 166 indicating a value held by the user program 154 executed in the controller 100.

The scheduler program 170 manages, for example, resource allocation and execution timing for a process and a task performed in the controller 100.

The input program 172 obtains input data from each device connected to the controller 100 with a local bus or a fieldbus.

The output program 174 outputs a command value (output data) calculated by the user program 154 executed in the controller 100 to a target device connected with a local bus or a fieldbus.

The software configuration may further include a statistical recording program executed by the PLC engine 150 for statistically processing data managed by the controller 100, including input data, output data, operation data, manufacturing data, and event data, and writing the data to the time-series database 180. Examples of such statistical processes include piecewise aggregate approximation (PAA)

and symbolizing into a discrete string (symbolic aggregate approximation or SAX). PAA determines a pattern in time-series data to allow easy compression using the determined pattern, whereas SAX converts the time-series data into a character string to allow easy compression and pattern determination.

The upper connection program 192 is executed by the PLC engine 150 to transmit and receive data to and from an external device connected to the upper network 6, such as the MES 400. The controller 100 according to one or more embodiments may output input data or operation data to the MES 400 and receive manufacturing information from the MES 400. The upper connection program 192 causes a manufacturing data obtaining process to be performed for obtaining manufacturing data from the MES 400 associated with a control target.

When the MES 400 has an internal database or a separate database, the upper connection program 192 may be replaced with or may include a database connection program. The database connection program may be executed to, for example, transmit a query such as a structured query language (SQL) to a relational database and receive a response.

The gateway program 194 is executed by the PLC engine 150 to provide time-series data to the IoT service 450. More specifically, the gateway program 194 obtains specified data from the time-series database 180 in specified cycles to output the data as time-series data. The time-series data output to the IoT service 450 by the gateway program 194 will be described in detail later.

The input program 172 in the controller 100 obtains input data from sensors through a local bus and/or a fieldbus.

The upper connection program 192 in the controller 100 obtains manufacturing data from the MES 400. The variable management program 160 manages the obtained input data and the manufacturing data in the form of variables.

The user program 154 refers to the system variable 162, the device variable 164, and the user variable 166 managed by the variable management program 160 to perform a predefined control operation and output the operation results (output data) to the variable management program 160.

The output program 174 outputs the output data calculated through the control operations performed by the user program 154 to actuators as a control output through the local bus and/or the fieldbus.

The database writing program 156 writes an observation value specified from the variables managed by the variable management program 160 to the NBQ 158. The database manager 182 in the time-series database 180 sequentially reads data stored in the NBQ 158 in a queue, and sequentially adds records including the read data to the database file 186.

The upper connection program 192 outputs the value of a variable specified from the variables managed by the variable management program 160 and/or a record specified from the records included in the database file 186 in the time-series database 180 to the MES 400 as time-series data.

The gateway program 194 outputs the value of a variable specified from the variables managed by the variable management program 160 and/or a specified record selected from the records included in the database file 186 in the time-series database 180 to the IoT service 450 as time-series data. The IoT service 450 uses the time-series data from the controller 100 to perform a behavior analysis, and performs predictive maintenance for a control target such as a piece of equipment or an apparatus.

D. Data Writing to Time-Series Database

A process for writing data to the time-series database 180 in the controller 100 according to one or more embodiments will now be described.

Figure 4:
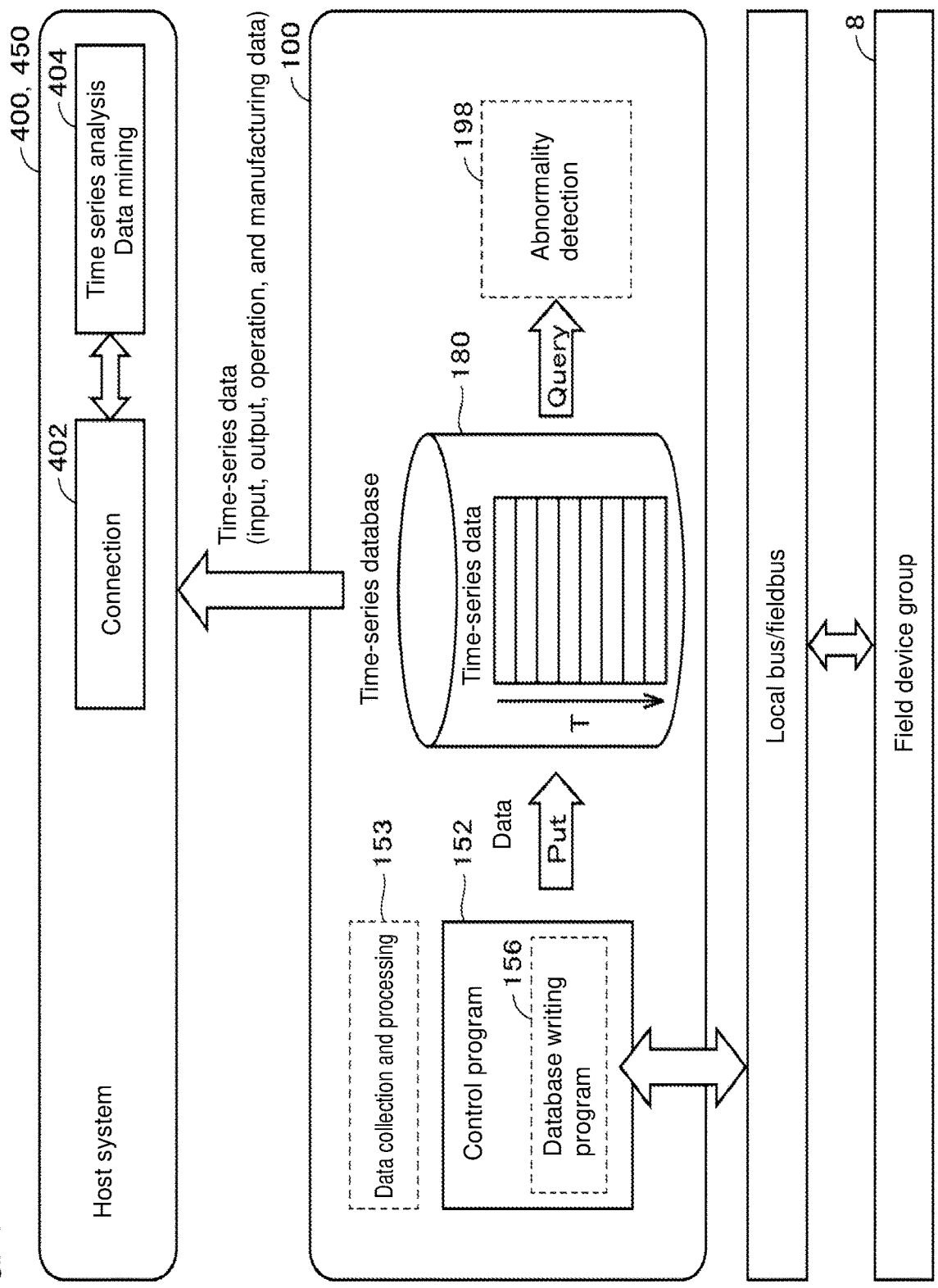
FIG. 4 is a schematic diagram illustrating main processing associated with a time-series database in a controller according to one or more embodiments.

FIG. 4 is a schematic diagram showing main processing associated with the time-series database 180 in the controller 100 according to one or more embodiments. Referring to FIG. 4, the controller 100 transmits and receives input data and output data to and from the field device group 8 through the local bus or the fieldbus.

The controller 100 cyclically executes the control program 152 including various operations for controlling manufacturing apparatuses and equipment in predetermined control cycles. The control program 152 includes an instruction for starting the database writing program 156 when a data writing condition is satisfied.

The database writing program 156 generates an instruction for writing specified data (one or more variable values) to the time-series database 180. For example, a Put instruction is shown in FIG. 4. Data written to the time-series database 180 from the database writing program 156 may be collected and processed in data collection and processing 153. The data collection and processing 153 may be performed in the control program 152 or in parallel with the control program 152.

The time-series database 180 stores data from the database writing program 156 in chronological order (time-series data). The time-series data stored in the time-series database 180 may be transmitted to a host system and used in analysis or other processes.

In the configuration shown in FIG. 4, the host system, such as the MES 400 or the IoT service 450, includes connection 402, with which intended time-series data is retrieved from the time-series database 180. The host system subjects the retrieved time-series data to an analysis, such as a time series analysis or data mining.

In one or more embodiments, the time-series data stored in the time-series database 180 may be used in abnormality detection 198, which is performed when the PLC engine 150 executes an intended program. The abnormality detection 198 compares the time-series data from the time-series database 180 with, for example, pre-obtained training data to detect an abnormality or a sign of an abnormality in a control target.

The controller 100 executes the control program 152 in predetermined control cycles (e.g., from several hundred microseconds to several milliseconds). In synchronization with the cyclic execution of the control program 152, data may be written to the time-series database 180. The time-series database 180 is basically defined in the storage (the internal storage 108 or the external storage 116 shown in FIG. 2). This storage typically has a large capacity but has a lower access speed (particularly a lower writing speed) than a main memory, and can have a varying access speed (e.g., 100 to 1000 milliseconds).

To write data within the control cycle of the controller 100, data may be stored into a volatile main memory. In this case, the data can be lost when, for example, the controller 100 is shut off, disabling permanent storage of the data.

In another case, the data collection and processing 153 may be performed to reduce the frequency of data writing (for example, the volume of data to be written in ten control cycles may be written at a time). In this case, the data storing speed can vary.

In another case, the data collection apparatus described in Patent Literature 1 may be used. In this case, data is collected and stored independently of the control operation performed by the control program 152; however, the data collection and storing is not completely synchronized with the control program 152. This may adversely affect the posterior analysis.

The controller 100 according to one or more embodiments enables data to be written to the time-series database 180, which uses the storage with a lower access speed, in synchronization with the control cycle.

More specifically, the data writing process from the control program 152 (database writing program 156) to the time-series database 180 includes a lock-free queue or the NBQ 158 (refer to FIG. 3). When the NBQ 158 is used, the database writing program 156 may generate a data write instruction in short cycles compared with the access speed in the storage, without suspending the execution of the database writing program 156 until the data writing is complete. In other words, the NBQ 158 enables data to be written to the time-series database 180 in synchronization with the control cycle.

Storing the time-series data in synchronization with the control cycle allows the input data (e.g., measured values from an analog sensor), the output data (e.g., a position instruction and a speed instruction), the operation data (e.g., a filter parameter and a feature quantity used in the abnormality detection), and the manufacturing data (e.g., manufacturing states and a product number) to be stored into a nonvolatile storage in every control cycle with the instruction included in the control program 152.

Figure 6:
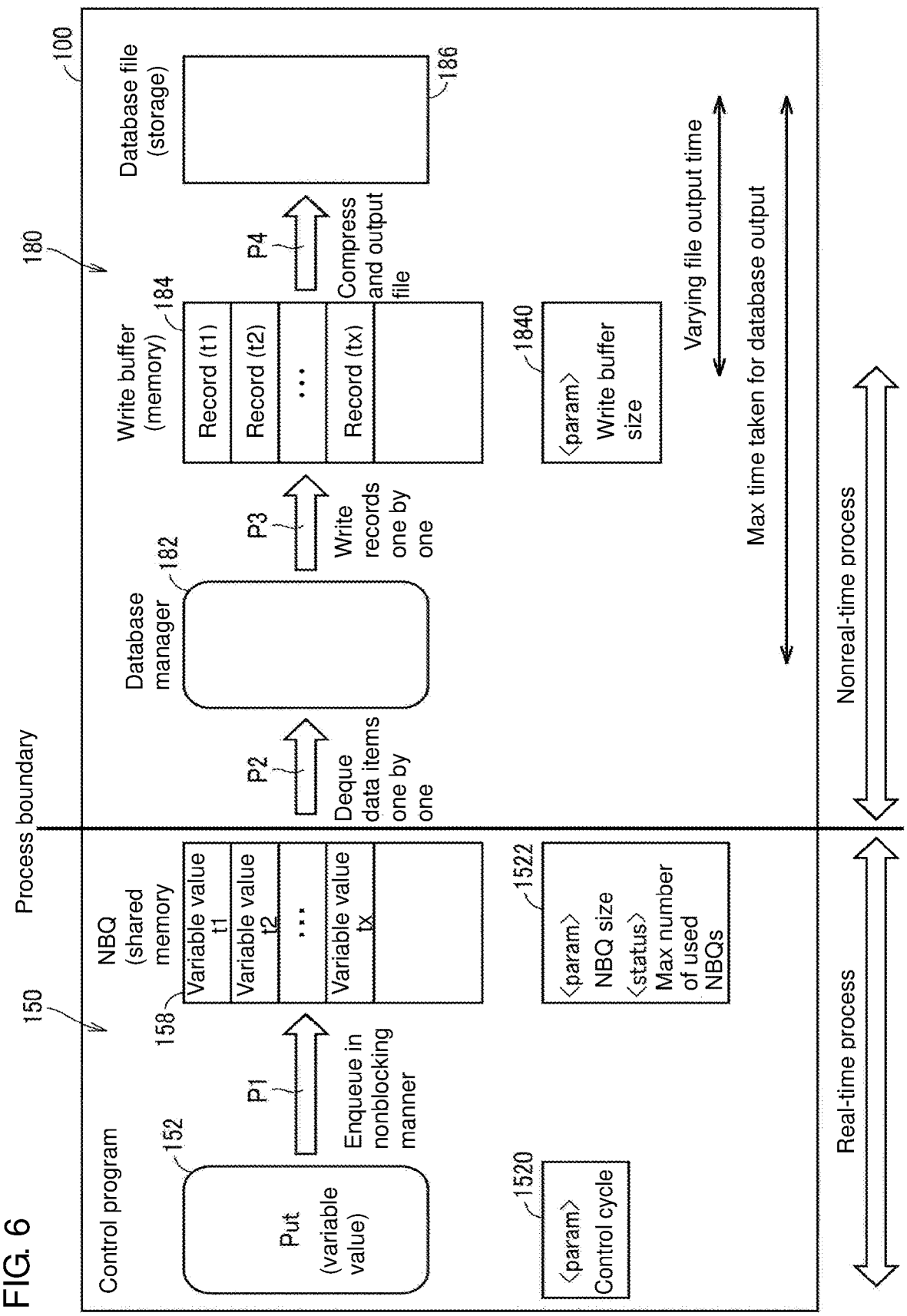
FIG. 6 is a schematic diagram illustrating a process for writing time-series data to a time-series database in a controller according to one or more embodiments.

FIG. 6 is a schematic diagram showing a process for writing the time-series data to the time-series database 180 in the controller 100 according to one or more embodiments. Referring to FIG. 6, in the controller 100, the data instructed to be written from the control program 152 is output as a database file 186 in the time-series database 180. The process is broadly divided into a real-time process and a nonreal-time process.

The real-time process is, for example, a cyclic process performed in synchronization with the control cycle, and is basically guaranteed to complete the process from the start within a predetermined time. Unlike the real-time process, the nonreal-time process may have a varying length of time depending on disturbance factors, rather than using a guaranteed time for performing the process.

In the controller 100, the PLC engine 150 performs the real-time process, whereas the time-series database 180 performs the nonreal-time process.

In the PLC engine 150, the database writing program started by the control program 152 (with, for example, a Put instruction in the control program 152) sequentially writes (or enqueues) specified data (more specifically, one or more variable values) to the NBQ 158 (process P1). The data (one or more variable values) from the control program 152 to the NBQ 158 is enqueued to the NBQ 158 in a nonblocking manner.

The data from the control program 152 is sequentially stored into the NBQ 158 in chronological order, and is sequentially retrieved from the NBQ 158 by the database manager 182 in the stored order. More specifically, the data items included in the time-series data are enqueued and/or dequeued to and from the NBQ 158 in a first-in first-out (FIFO) manner.

In the time-series database 180, the database manager 182 sequentially reads (or dequeues) the data (including one or more variable values) stored in the NBQ 158 (process P2), and sequentially writes the read data to the write buffer 184 (process P3). When records are written from the NBQ 158 to the write buffer 184, the database manager 182 may add index values or check for any data corruption.

The write buffer 184 sequentially stores the records from the database manager 182. The write buffer 184 temporarily stores the data read from the NBQ 158. Once a predetermined number of data items are stored into the write buffer 184, the data items are subjected to a predetermined compression process, and then output to the database file 186 (process P4).

The output from the write buffer 184 to the database file 186 is performed by the database manager 182. More specifically, the database manager 182 outputs the multiple data items stored in the write buffer 184 to the database file 186 as records.

As described above, in accordance with the characteristics of the storage in data writing, the plurality of records in the write buffer 184 are integrated into a relatively large data block to be output to the database file 186. The plurality of records, which have been compressed to be formed into a continuous data row, are output to the database file 186. This reduces variations in times taken to output the files from the write buffer 184 to the database file 186, and compensates for the relatively low access speed.

The NBQ 158 is sized to allow the control program 152 to write data to the NBQ 158 in synchronization with the control cycle. In one example, the NBQ 158 is sized to prevent overflow of a queue stored in the NBQ 158 in accordance with the data speed at which data is cyclically written from the control program 152 based on the maximum time taken by the database manager 182 to write data to the write buffer 184 and the maximum time taken by the write buffer 184 to output data to the database file 186 (a maximum value of time taken for the database output process shown in FIG. 6), as well as based on variations in times taken to output data from the write buffer 184 to the database file 186 (variations in times taken to output files shown in FIG. 6). More specifically, the NBQ 158 is sized based on the data speed at which data is cyclically generated through the data generation process to prevent overflow of data stored in the NBQ 158.

As described above, the controller 100 according to one or more embodiments includes the NBQ 158 and the write buffer 184. This structure allows time-series data to be generated and stored in synchronization with the control cycle using a storage with a lower access speed than a memory.

E. Data Structure

The data structure of a record to enter the time-series database 180 in the controller 100 according to one or more embodiments will now be described.

The controller 100 may generate a record including an observation value associated with a control target, a time associated with the observation value specified through a time management process, and/or a counter value associated with the observation value indicated by an inner counter. The observation value is usable by the processor 102.

FIGS. 5A and 5B are diagrams each showing an example data structure of a record stored in the time-series database 180 in the controller 100 according to one or more embodiments. Referring to FIG. 5A, the record generated in the controller 100 includes a time field 1821, a counter value field 1822, an index field 1823, and an observation value field 1824.

The time field 1821 and the counter value field 1822 store information indicating the time at which the corresponding data (one or more observation values) is obtained.

More specifically, the time field 1821 stores the time at which the corresponding data is obtained (e.g., the time managed by the RTC 128).

The counter value field 1822 stores a counter value counted when the corresponding data is obtained. The counter value is at least one of a counter value from the counter managed by the controller 100 and a counter value from the counter for timing management in the fieldbus and/or the local bus. The counter value stored in the counter value field 1822 as well as the time stored in the time field 1821 support posterior analysis of the corresponding data (observation value).

The index field 1823 stores a value (index value) that is incremented or decremented by a predetermined value in accordance with the operation for writing a record to the database. The value is typically incremented by one each time a record is stored. For example, when the user program 154 includes an instruction to start the database writing program 156, the index value may be incremented upon execution of the start instruction. When the controller 100 uses a plurality of time-series databases 180, the index value may be set separately for each database.

The observation value field 1824 stores specified data (one or more observation values). Example data to be stored into the observation value field 1824 includes input data, output data, operation data, manufacturing data, and event data.

More specifically, the input data includes digital signals (status values) and analog signals (various measurement signals) obtained by various sensors. In addition to the observation values, the input data may also include information for identifying each sensor that has output the observation value.

The output data may include a command value output to, for example, a motion drive or an opening adjuster. In addition to the command value, the output data may also include information for identifying an actuator to which the command value is to be output.

The operation data may include a variable value or a transient value calculated by executing the user program 154. In addition to the variable value or the transient value, the operation data may also include information for identifying the user program 154 or a task used to output the operation data.

The manufacturing data may include a set of execution command values (e.g., the product number, the lot number, or the recipe number of a workpiece) received from the MES 400. The execution command value set may include an identification number for uniquely identifying each workpiece and information for identifying the workpiece type.

The event data may include information indicating an observation value exceeding or falling under a predetermined threshold and information indicating a predetermined abnormal flag that has been turned on. The data may also include information such as a variable that has generated the event data.

The event data may be generated when a predetermined condition is satisfied, rather than being time-series data that is repeatedly generated or stored in predetermined cycles. In this case, the event data may also be associated with a synchronized counter value and/or a time.

A record described above is generated and output in every control cycle or for every predetermined event. In the example shown in FIG. 5B, a record is generated and output every 500 microseconds. Such records including specified observation values are generated and output chronologically. Such time-series data is used for various analyses.

The record shown in FIGS. 5A and 5B may have the key-value structure.

In this case, for example, the time field 1821 and the counter value field 1822 may store keys, and the index field 1823 and the observation value field 1824 may store values. More specifically, each record of time-series data includes the keys that are the time and the counter value associated with the observation value and the values corresponding to the observation values.

Although records are typically stored into the time-series database 180 included in the controller 100 as described above, the records may be transmitted to an external device, such as a host system. In this case as well, the record shown in FIGS. 5A and 5B may be generated in every control cycle and may be transmitted to an intended external device.

The database manager 182 and the database file 186 included in the time-series database 180 in the controller 100 may not be included in the same controller 100. More specifically, the database manager 182 included in the controller 100 may read data from the NBQ 158 and write the record to the database file 186 external to the controller 100. The devices external to the controller 100 may include a storage for another controller 100 and a storage defined on a network (network storage).

The NBQ 158 is implemented in the controller 100 according to one or more embodiments and located in the logical data transmission path from the database writing program 156 to the time-series database 180. The NBQ 158 compensates for the low writing speed in the storage, and can further offset the low writing speed in a network storage.

This structure for writing records to a network storage allows storage of more data than the structure for having records in the database file 186 included in the controller 100. This system may involve a plurality of controllers 100 that each individually write records to a single network storage, and achieves an integrated storage. This system is advantageous in improving the security of data and allowing data management.

F. Nonblocking Process: Linking Real-Time Process and Nonreal-Time Process

Communicating data between a real-time process and a nonreal-time process in the controller according to one or more embodiments will now be described.

As shown in FIG. 6, the controller 100 according to one or more embodiments includes the NBQ 158 defined in a shared memory area, which is accessible in both the real-time process and the nonreal-time process.

More specifically, the control program 152 involved in the real-time process sequentially writes data to the NBQ 158 (in other words, the control program 152 provides a Put instruction), enqueueing one or more data items to the NBQ 158 in the order of writing. The database manager 182 involved in the nonreal-time process obtains data stored in the NBQ 158 in a FIFO manner (in other words, the database manager 182 provides a Get instruction).

Figure 7:
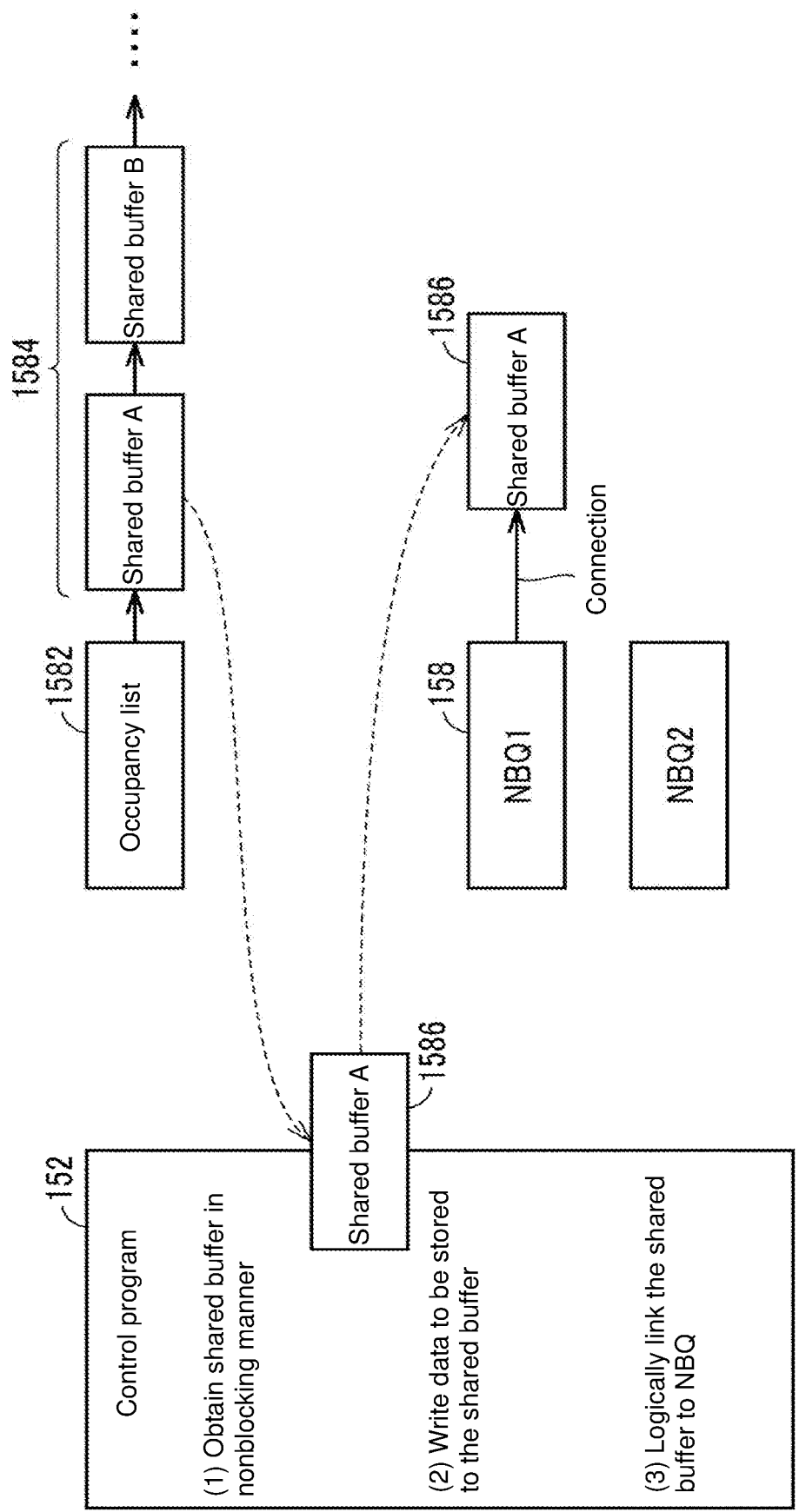
FIG. 7 is a schematic diagram illustrating a nonblocking process performed in a controller according to one or more embodiments.

FIG. 7 is a schematic diagram describing a nonblocking process performed in the controller 100 according to one or more embodiments. FIG. 7 shows an example process for storing data from the control program 152 into the NBQ 158.

Referring to FIG. 7, the shared memory area defined in the volatile main memory 106 includes a plurality of shared buffers A, B, and other buffers (buffer pool 1584), and an occupancy list 1582 for managing either the used or unused status of each shared buffer. More specifically, the NBQ 158 includes the multiple shared buffers logically defined in the shared memory area and the occupancy list 1582 for managing the storage status of data in each shared buffer.

In response to a data writing event, the control program 152 (precisely a process for executing the control program 152; the same applies hereafter) refers to the occupancy list 1582 to determine an available shared buffer (shared buffer A in the example of FIG. 7) from the buffer pool 1584, and obtains the determined shared buffer in a nonblocking manner (process (1) in FIG. 7). The nonblocking manner refers to the state with no exclusion process, such as a process for blocking access from other processes or tasks. More specifically, the nonblocking manner refers to the mode achieved in normal processing with no special processing such as an exclusion process.

The control program 152 then writes data to be stored into the obtained shared buffer (process (2) in FIG. 7). In writing the data to the obtained shared buffer, an exclusion may be performed to prevent contention with another data writing process.

The exclusion may be performed using a compare-and-swap (CAS) instruction, which is a processor instruction. Instead of a CAS instruction, a semaphore may be used to perform exclusion control between processes, or mutual exclusion (mutex) may be used to perform exclusion control between threads.

The shared buffer to which data has been written is then logically linked to the NBQ 158 (process (3) in FIG. 7). More specifically, reference information, such as an address for identifying the shared buffer to which data has been written, is added as a new entry to the NBQ 158. Such logical linking allows the NBQ 158 to write and read data in a FIFO manner. The shared buffers from which data has been read, among the shared buffers included in the NBQ 158, may sequentially be logically delinked from the NBQ 158, and may be placed in the buffer pool 1584 as unoccupied shared buffers.

As described above, data generated by the database writing program 156 is stored into a shared buffer specified by referring to the occupancy list 1582. The shared buffer storing data is then logically linked to a shared buffer storing preceding data (that is, the NBQ 158 before updated). The shared buffer from which the data has been read, among the logically-linked shared buffers, is logically delinked.

As described above, the unoccupied shared buffers are managed, and the shared buffer to which data is written is logically referred to. This enables data passing in a nonblocking manner in one or more embodiments.

The controller 100 according to one or more embodiments uses the queue enabled in the shared memory area to pass data between the real-time process and the nonreal-time process in a nonblocking manner. However, the controller 100 may not use the queue, and may use a message passing technique or a handshaking scheme combining a memory and a flag.

G. Parameter Setting

Parameters used in the controller 100 according to one or more embodiments will now be described.

The controller 100 according to one or more embodiments may allow data to be cyclically written in synchronization with the control cycle. Referring back to FIG. 6, the controller 100 includes setting information 1520 defining the control cycle. The setting information 1520 includes a parameter defining cyclic execution of a control operation. The parameter is appropriately defined in accordance with the type and the characteristics of a control target.

The NBQ 158 and the write buffer 184 each have a size optimized based on the cycle of data writing and the amount of data resulting from the control program 152 as well as the data generation speed of the database file 186. As shown in FIG. 6, the controller 100 includes setting information 1522, which includes a parameter defining the data size of the NBQ 158, and setting information 1840, which includes a parameter defining the data size of the write buffer 184.

The parameter included in the setting information 1522 defines the data size or the buffer capacity of the NBQ 158. The parameter included in the setting information 1840 defines the buffer capacity of the write buffer 184. The values of these parameters are appropriately adjusted and set.

The target and the cycle of the time-series data to be stored into the time-series database 180 may be explicitly described in, for example, the user program 154 included in the control program 152 (refer to FIG. 3). When the system program is partially responsible for data collection and storage, a user interface may be provided for the user to specify a variable and its corresponding cycle to be collected and stored as data.

Figure 8:
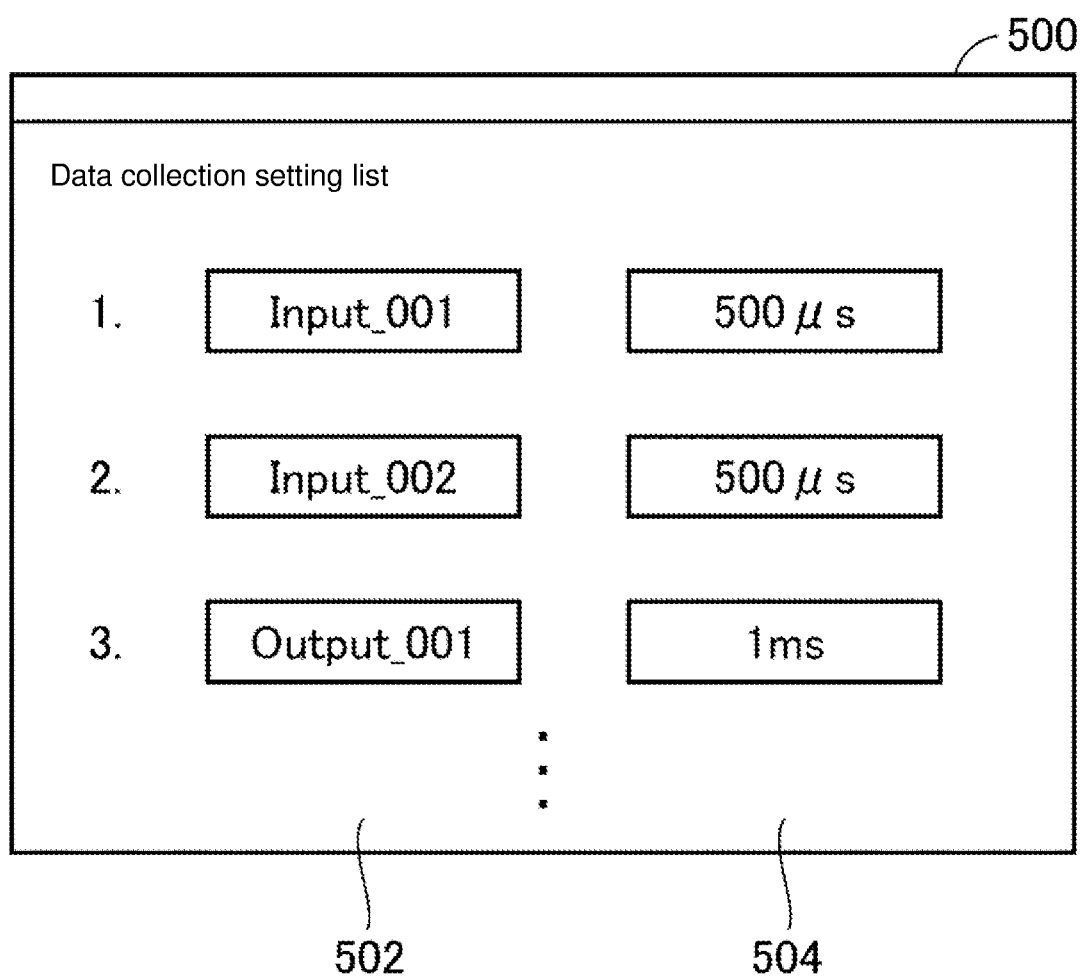
FIG. 8 is a diagram illustrating an example user interface screen for setting variables and cycles to be stored into a time-series database in a controller according to one or more embodiments.

FIG. 8 is a diagram showing an example user interface screen for specifying variables and cycles to be stored into the time-series database 180 included in the controller 100 according to one or more embodiments. The user interface screen shown in FIG. 8 appears on, for example, a display included in the support apparatus 200 (refer to, for example, FIG. 1) connected to the controller 100.

Referring to FIG. 8, the user interface screen includes a setting screen 500 on which variable names 502 for identifying data to be stored into the time-series database 180 and their storage cycles 504 can be specified in an associated manner. The user operates the setting screen 500 to freely specify variables to be collected and their corresponding collection cycles.

The settings specified by the user by operating the setting screen 500 are provided to the control program 152 in the controller 100. In accordance with the settings, data is collected and written to the time-series database 180.

The setting screen 500 shown in FIG. 8 allows a user who may not be able to change the user program to select intended variables and to store intended data as time-series data.

H. Status Output/Log Output

The controller 100 according to one or more embodiments optimizes the size of the NBQ 158 and the size of the write buffer 184 to improve the throughput in generating the database file 186 in the time-series database 180.

To tune the performance or to identify a cause for any failure, the controller 100 may output the status or the log associated with the time-series database 180. For example, the controller 100 may output status information indicating the status of the operations associated with the time-series database 180, including storing data into the NBQ 158.

FIG. 9 is a diagram showing example status information about the time-series database 180 output from the controller 100 according to one or more embodiments. FIG. 9 shows a status information list 700 including information about the performance of the time-series database 180 and information about the processes performed by the database manager 182.

For example, the status information list 700 includes write instruction execution results 702, such as the number of successes, the number of successful bytes, and the number of failures in executing a data write instruction (Put instruction) generated by the database writing program 156. The write instruction execution results 702 show the execution status in the process for data writing from the control program 152 to the NBQ 158, and are used as appropriate to adjust the size of the NBQ 158.

The status information list 700 also includes record entry results 704 indicating times taken to store records in the time-series database 180 in response to a data write instruction (Put instruction) generated by the database writing program 156. The record entry results 704 show the performance in storing records from the database writing program 156 to the time-series database 180, which are used as appropriate to adjust the size of the NBQ 158 and the size of the write buffer 184.

The status information list 700 also includes NBQ operation results 706 indicating the status of the NBQ 158. The NBQ operation results 706 show any overflow from data stored in the NBQ 158, which are used as appropriate to adjust the size of the NBQ 158, the size of write data, and the write cycle.

As described above, the controller 100 according to one or more embodiments may output information about the results associated with the operations of the time-series database 180. Such result information eases tuning of the performance in the time-series database 180.

I. Multicore

The time-series database 180 in the controller 100 according to one or more embodiments may use a processor including a plurality of cores (operation circuits) to perform its processes. In this case, the real-time process and the nonreal-time process shown in FIG. 6 may be performed using different cores.

Figure 10:
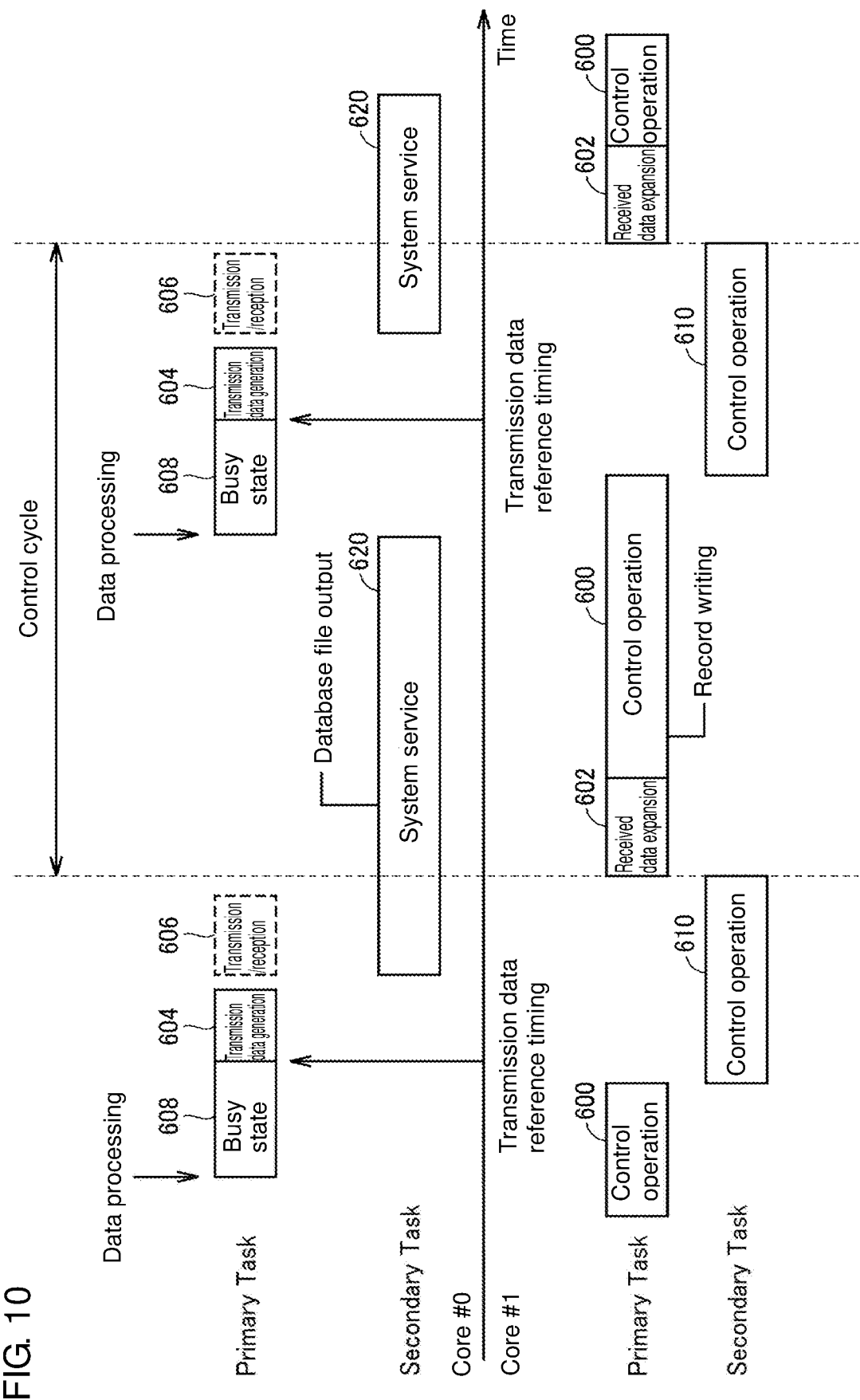
FIG. 10 is a time chart illustrating example processing performed in a controller according to one or more embodiments.

FIG. 10 is a time chart showing example processing performed in the controller 100 according to one or more embodiments. The processing shown in FIG. 10 is performed using the processor including two cores (core #0 and core #1).

The controller 100 includes a predefined process to be performed for every task using each core. Each task includes an execution priority, an execution cycle or an execution initiation, or processes (or programs) to be executed, which are all predefined. The predefined information for each task is preliminary stored into the internal storage 108 together with a user program or other data. The processor 102 executes the scheduler program 170 to successively select (or schedule) the programs to be executed by each core in accordance with the priority information included in the information defined for each task.

In the example shown in FIG. 10, each core includes a task with the highest execution priority (hereafter, a primary task) and a task with a lower execution priority than the primary task (hereafter, a secondary task).

The primary task is performed in every predetermined control cycle, whereas the secondary task is performed when a corresponding interrupt is provided. The setting information for each task allows each of the core #0 and the core #1 to basically perform a process entered as a primary task in every control cycle, and perform a process entered as a secondary task in an unoccupied time left without any primary task.

The core #0 mainly performs a data transmission process and a nonreal-time process shown in FIG. 6, whereas the core #1 mainly performs a real-time process shown in FIG. 6. More specifically, a task assigned to the core #0 includes the data transmission process and the nonreal-time process shown in FIG. 6, whereas a task assigned to the core #1 includes the real-time process shown in FIG. 6.

In the example shown in FIG. 10, the primary task assigned to the core #0 includes transmission data generation 604 and an exclusion 608. The transmission data generation 604 may cause a data compression process for transmitting output values calculated by the control operation to the field device group 8. The exclusion 608 may cause an exclusion to generate the transmission data. This exclusion appears in the busy state when viewed from other processes. After the transmission data generation 604 is complete, data transmission/reception 606 is performed.

The data transmission/reception 606 is performed by the local bus controller or the fieldbus controller (refer to, for example, FIG. 2), instead of being performed by the processor. This structure allows a system service 620 to serve as a secondary task that can be performed before a subsequent exclusion 608 is started after the transmission data generation 604 is complete.

The system service 620 is not directly associated with a control operation in the controller 100, but involves supplemental processes provided by the controller 100. The system service 620 includes an output process for the database file 186, or more specifically a process in which the database manager 182 dequeues data from the NBQ 158 and outputs the database file 186 (nonreal-time process). The database manager 182 performs this nonreal-time process during an unoccupied time of the processor.

The database manager 182, which provides supplemental processes that are not directly associated with a control operation for a control target, operates during an unoccupied time of the processor. The supplemental processes thus do not affect the transmission data generation 604 and the exclusion 608 for the control operation.

The primary task allocated to the core #1 includes a control operation 600 with a higher priority and received data expansion 602, whereas the secondary task includes a control operation 610 with a lower priority.

The control operation 600 performs processes defined in the user program 154 for controlling a control target. The received data expansion 602 expands input data received from, for example, a field device group 8 to update input variables. The control operation 600 includes an instruction to write a record to the time-series database 180. More specifically, the control operation 600 is performed to write data to be included in the record to the NBQ 158. After the control operation 600, the control operation 610 with a lower priority is performed, while the control operation 600 and the received data expansion 602 are not being performed.

As described above, the database writing program 156 involves a real-time process, which is a single data generation process that is completed within a predetermined cycle (control cycle).

In the example shown in FIG. 10, the process for data generation and the process for implementing the database manager 182 may be performed using different cores (operation circuits). The process for outputting the database file 186 (nonreal-time process) is performed using a core different from the core to perform the control operation. The process for collecting and storing the time-series data thus does not affect any control operation. Additionally, the data write instruction and the control operation are performed using the same core to allow the time-series data to be collected and written in every control cycle. This allows collection and storage of more detailed information about the field.

J. Applications

Applications using the time-series data generated and output from the controller 100 according to one or more embodiments will now be described.

Figure 11:
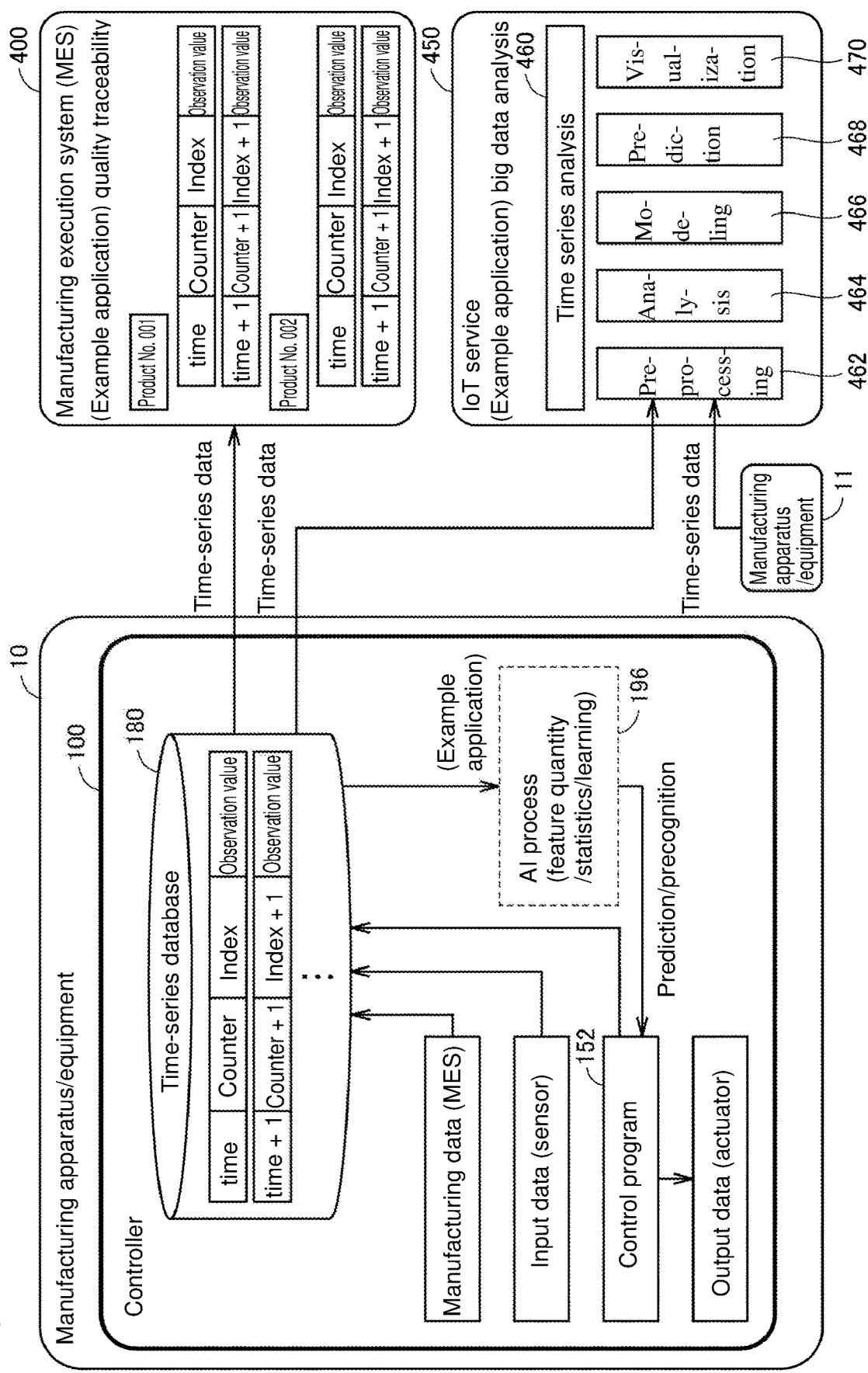
FIG. 11 is a diagram illustrating an example application using time-series data stored in a time-series database in a controller according to one or more embodiments.

FIG. 11 is a diagram describing an example application using time-series data stored in the time-series database 180 in the controller 100 according to one or more embodiments.

In the example shown in FIG. 11, the MES 400 uses time-series data stored in the time-series database 180 in the controller 100, and provides quality traceability. More specifically, the MES 400 uses manufacturing data included in the time-series data stored in the time-series database 180, and identifies a workpiece (product) associated with the time-series data. The time-series data for each workpiece is arranged in the order in which the data is generated. This information then can be used to determine the manufacturing state of each workpiece. In FIG. 11, for example, a plurality of items of time-series data are stored in a manner associated with the workpiece with product number 001, whereas a plurality of items of time-series data are stored in a manner associated with the workpiece with product number 002.

As described above, the MES 400 may use time-series data stored in the time-series database 180 in the controller 100 to generate information about quality traceability.

In generating such information about quality traceability, the information may be associated with time information and counter information to process observation values included in the time-series data with more precise time information.

In the example shown in FIG. 11, the IoT service 450 enables the big data analysis. The IoT service 450 receives time-series data from the controller 100 that controls a manufacturing apparatus or a piece of equipment 10 and also from another manufacturing apparatus or another piece of equipment 11. The IoT service 450 includes various analyses about time-series data provided from one or more manufacturing apparatuses or pieces of equipment. One example is a time series analysis 460.

The time series analysis 460 is performed by one or more processors included in the system providing the IoT service 450. In the time series analysis 460, the processor(s) perform preprocessing 462 on time-series data. In the preprocessing 462, one or more processors may extract, for example, a feature quantity from the time-series data stored in a storage, and may process the data to reduce its dimensions and to exclude abnormal values and outliers. The processor(s) further perform an analysis 464 about the time-series data that has undergone the preprocessing 462. The processor(s) use the results from the analysis 464 to perform modeling 466, or specifically generate a model for a control target, such as a manufacturing apparatus or a piece of equipment. The processor(s) store the generated model (a set of functions or parameters) into a storage. The processor(s) use the generated model to perform prediction 468, or predict an abnormality or deterioration. The processor(s) may finally output the results from the prediction 468 visually onto a display or other devices in a graph or a table (visualization 470).

As described above, the IoT service 450 performs data analysis using time-series data stored in the time-series database 180 in the controller 100. The IoT service 450 may be performed typically in an environment with sufficient computation resources on a cloud, and thus can find hidden characteristics by using a large amount of time-series data.

In such data analysis, the time information and the counter information are associated in the time-series data for more precise determination of the temporal relationship between the observation values included in the time-series data. This enables more accurate and useful analysis. For example, generating a model includes searching for hidden cause and effect between the observation values, which may be unnoticeable due to temporal deviations. The system according to one or more embodiments includes the preprocessing for more accurately determining the temporal relationship between the observation values, and thus can generate a more accurate model.

The system is also useful in referring to the time at which any abnormality has occurred to verify data about the equipment at the time of the abnormality.

In the example shown in FIG. 11, the controller 100 includes an artificial intelligence (AI) process 196. The AI process 196 includes, for example, supervised machine learning to preliminary detect an abnormality or a deterioration tendency in a control target, such as a manufacturing apparatus or a piece of equipment.

More specifically, the AI process 196 generates a feature quantity from one or more observation values included in time-series data stored in the time-series database 180 in the controller 100, and subjects the generated feature quantity to statistical processing and store the feature quantity data as learning data. The AI process 196 receiving any new observation value calculates a deviation of the input observation value from the learning data, and uses the calculated deviation to determine an abnormality or a deterioration tendency.

The AI process 196 implemented in the controller 100 allows substantially real-time detection of an abnormality or a deterioration tendency in a control target, such as a manufacturing apparatus or a piece of equipment.

K. Advantages

The controller according to one or more embodiments cyclically generates an instruction for writing a record including specified data to the time-series database in synchronization with the control cycle. Such cyclic instructions to write data to the database cause specified data to be sequentially stored into the NBQ. The process for generating a write instruction as a part of a control operation can be performed before data storage into the NBQ is complete, and thus does not affect the execution cycle of the control operation.

In the time-series database, the data stored in the NBQ is read and output as a database file. This process for outputting the database file includes integrating the data using, for example, a write buffer and writing the data to the storage in accordance with the characteristics of the storage for the database file. The output process from the NBQ to the database file is performed in accordance with the characteristics of the storage. The time-series database can thus be formed using a storage with a large capacity but with relatively low access speed.

One or more embodiments disclosed herein are only illustrative in all respects and should not be construed to be restrictive. The scope of the present invention is not defined by the description given above but by the appended claims, and all changes that come within the meaning and range of equivalency of the claims are intended to fall within the claims.

REFERENCE SIGNS LIST

1 control system
2, 4 fieldbus
6 upper network
8 field device group
11 equipment
12 remote I/O device
14 relay group
16, 124 I/O unit
18 image sensor
20 camera
22 servo driver 24 servomotor
100 controller
102 processor
104 chipset
106 main memory
108 internal storage
110 upper network controller
112 USB controller
114 external storage interface
116 external storage
118, 120 fieldbus controller
119, 121, 123, 125, 126 counter
122 local bus controller
128 RTC
150 PLC engine
152 control program
153 data collection and processing
154 user program
156 database writing program
160 variable management program
162 system variable
164 device variable
166 user variable
170 scheduler program
172 input program
174 output program
180 time-series database
182 database manager
184 write buffer
186 database file
192 upper connection program
194 gateway program
196 AI process
198 abnormality detection
200 support apparatus
300 display
400 manufacturing execution system
402 connection
450 IoT service
460 time series analysis
462 preprocessing
464 analysis
466 modeling
468 prediction
470 visualization
500 setting screen
502 variable name
504 storage cycle
600, 610 control operation
602 received data expansion
604 transmission data generation
606 data transmission/reception
608 exclusion
620 system service
700 status information list
702 write instruction execution result
704 record entry result
706 operation result
1520, 1522, 1840 setting information
1582, 1585 occupancy list
1584 buffer pool
1821 time field
1822 counter value field
1823 index field
1824 observation value field

The invention claimed is:

1. A controller for controlling a control target comprising:
a time-series database configured to store a record including data about the control target in chronological order; and
a processor configured with a program to perform operations comprising
operation as a processing engine configured to cyclically execute a control program in predetermined control cycles,
operation as a data generator configured to generate data to be included in the record to be stored in the time-series database in every one of the predetermined control cycles,
operation as a nonblocking queue included in a volatile main memory that is configured to sequentially store the data generated by the data generator such that a process of storing the data generated in one of the predetermined control cycles to be included in the record in the nonblocking queue is completed within the one of the predetermined control cycles, and
operation as a database manager configured to sequentially read the data stored in the nonblocking queue and write the read data into the time-series database; wherein the database manager is configured to sequentially read the data stored in the nonblocking queue and write the read data into the time-series database during an unoccupied time of the processor, independent from the predetermined control cycles.

2. The controller according to claim 1, wherein the processor is configured with the program such that
the nonblocking queue comprises a plurality of shared buffers logically defined in the main memory and an occupancy list for managing a data storage status of each of the plurality of shared buffers, and
data generated by the data generator is written into a shared buffer specified from the plurality of shared buffers by referring to the occupancy list, and the shared buffer storing the data is logically linked to another shared buffer storing preceding data.

3. The controller according to claim 2, wherein
the processor is configured with the program such that the logically-linked shared buffer is logically delinked in response to the data being read from the logically-linked shared buffer.

4. The controller according to claim 1, wherein
the time-series database further comprises a write buffer configured to temporarily store the data read from the nonblocking queue, and
the database manager outputs a plurality of data items stored in the write buffer to a database file, to be stored in the time-series database, as a record.

5. The controller according to claim 1, wherein
the processor is configured with the program such that the data generator performs a process using an operation circuit different in the processor from an operation circuit in the processor that is used by the database manager to perform a process.

6. The controller according to claim 1, wherein the processor is configured with the program to perform operations further comprising:
operation as a status information output unit configured to output information indicating a status of an operation associated with the time-series database, the operation including storing data into the nonblocking queue.

7. The controller according to claim 1, wherein
a size of the nonblocking queue is set based on a data speed at which the data generator cyclically generates data, such that the size of the nonblocking queue is large enough to prevent overflow of stored data.

8. The controller according to claim 2, wherein
the time-series database further comprises a write buffer configured to temporarily store the data read from the nonblocking queue, and
the database manager outputs a plurality of data items stored in the write buffer to a database file, to be stored in the time-series database, as a record.

9. The controller according to claim 3, wherein
the time-series database further comprises a write buffer configured to temporarily store the data read from the nonblocking queue, and
the database manager outputs a plurality of data items stored in the write buffer to a database file, to be stored in the time-series database, as a record.

10. The controller according to claim 1, wherein the control program comprises ladder logic defined with function blocks.

\* \* \* \* \*